No. 687,157. Patented Nov. 19, 1901.
B. KENNA.
TIRE APPLYING MACHINE.
(Application filed Jan. 26, 1901.)
(No Model.) 2 Sheets—Sheet I.
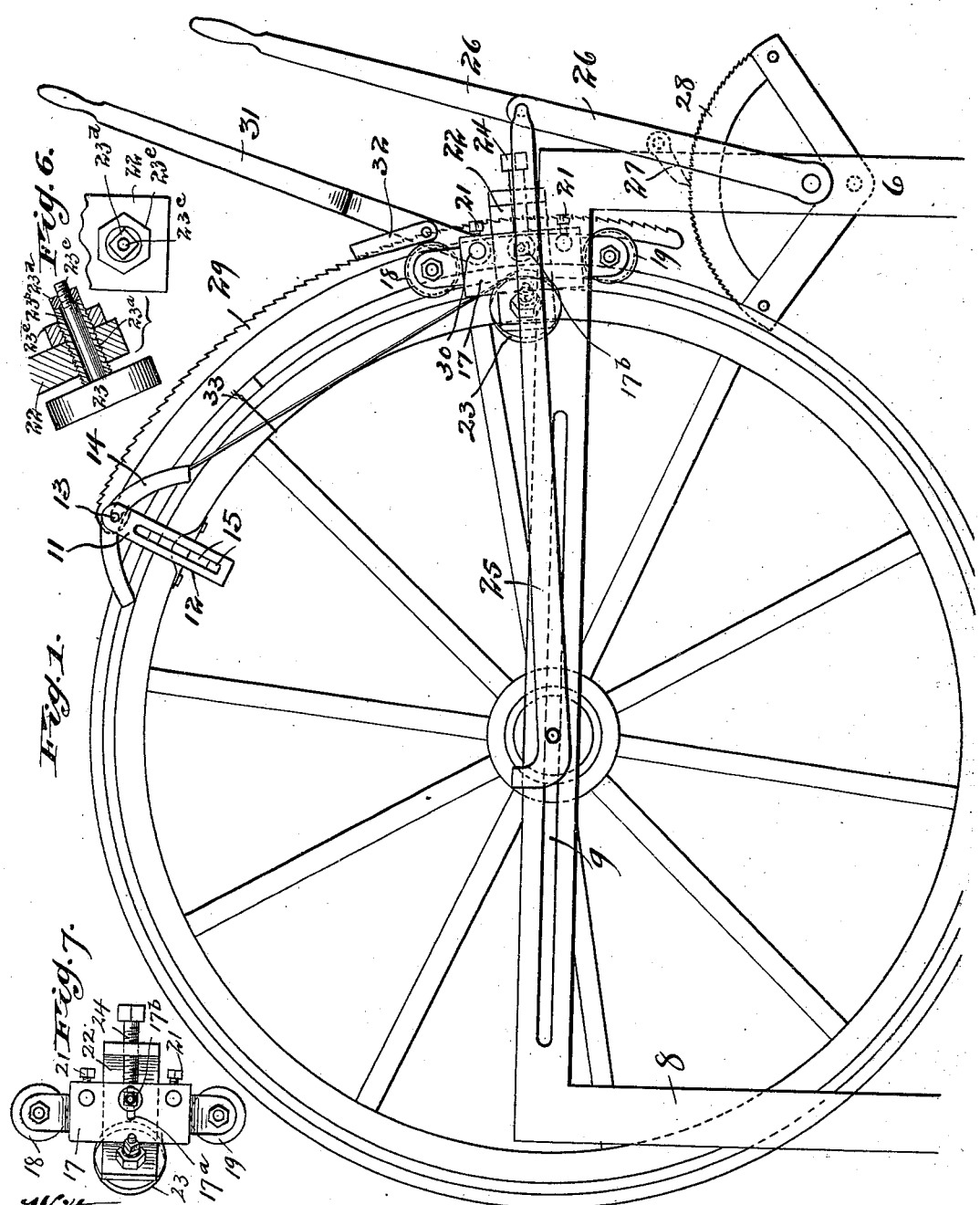
Witnesses,
T. J. Mann
S. N. Pond
Inventor,
Benjamin Kenna
By Offield, Towle & Linthicum
Attys.
THE NORRIS PETERS CO., PHOTO-LITHO., WASHINGTON, D. C.

No. 687,157. Patented Nov. 19, 1901.
B. KENNA.
TIRE APPLYING MACHINE.
(Application filed Jan. 26, 1901.)
(No Model.) 2 Sheets—Sheet 2.
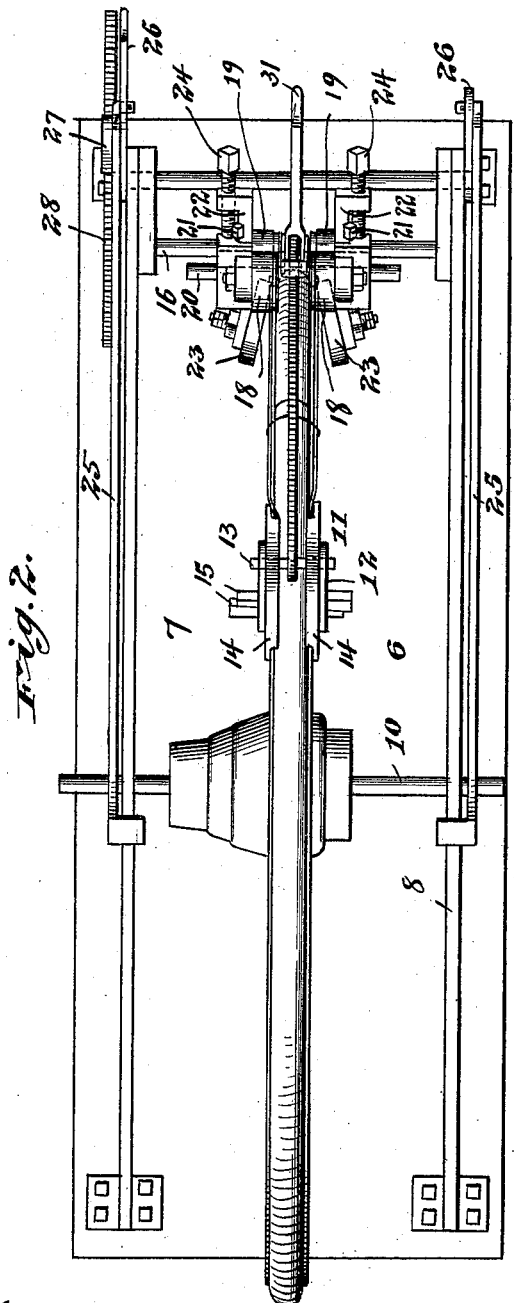
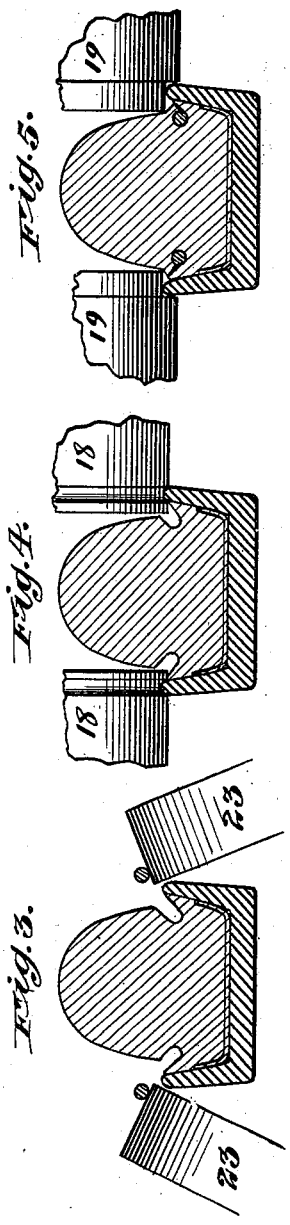
Witnesses,
S. J. Mann
S. N. Pond
Inventor,
Benjamin Kenna
By Offield, Towle & Linthicum
Attys.

UNITED STATES PATENT OFFICE.

BENJAMIN KENNA, OF CHICAGO, ILLINOIS, ASSIGNOR TO FIRESTONE TIRE & RUBBER COMPANY, OF AKRON, OHIO, A CORPORATION OF WEST VIRGINIA.

TIRE-APPLYING MACHINE.

SPECIFICATION forming part of Letters Patent No. 687,157, dated November 19, 1901.

Application filed January 26, 1901. Serial No. 44,938. (No model.)

*To all whom it may concern:*

Be it known that I, BENJAMIN KENNA, of Chicago, county of Cook, and State of Illinois, have invented certain new and useful Improvements in Tire-Applying Machines, of which the following is a specification.

My invention relates to an apparatus for applying tires to the wheels of vehicles and is adapted more particularly for use in connection with the application of resilient tires to that class of vehicle-wheels which have a circumferentially-channeled rim in which the base portion of the tire seats and in which the tire is secured in place by means of an endless retaining wire or band engaging either a shouldered or undercut portion of the tire, on each side thereof.

The object of my invention is to provide an inexpensive and simply-operated apparatus by the manipulation of which the tire may be held in place in the channel of the rim and the retaining wires or bands of less circumferential length than the outer edge of the rim may be forced over the edges of the rim and into engagement with their seats in the tire to hold the latter securely in place.

To this end my invention consists in an apparatus constructed and operating in the manner and as hereinafter described, and more particularly pointed out in the claims.

My invention in its preferred form is illustrated in the accompanying drawings, in which—

Figure 1 is a side elevation of my improved tire-applying apparatus shown in operative engagement with a vehicle-wheel. Fig. 2 is a plan view of the parts shown in Fig. 1. Figs. 3, 4, and 5 are enlarged cross-sectional details of the mechanism which directly operates to support and force the retaining-wires into operative engagement with the tire; and Figs. 6 and 7 are details illustrating certain adjustable features of said mechanism.

In the drawings, 6 designates as a whole a stationary frame adapted to support a vehicle-wheel in the operation of applying and securing the tire thereto. This frame may conveniently consist of a base-plate 7 and a pair of vertical parallel rectangular frames 8, the upper horizontal members of which are longitudinally slotted, as at 9, to receive and adjustably support a horizontal spindle 10, on which the vehicle-wheel is temporarily journaled in the tire-applying operation.

11 designates as an entirety a clamping device, which in the operation of applying the tire is adapted to initially hold the latter and its retaining wires or bands in fixed position in the wheel-rim, at any suitable point on the latter. This clamp comprises a pair of longitudinally-slotted plates 12, disposed transversely to the rim of the wheel and connected at their outer ends by a rod or bolt 13, on which latter and between the said plates 12 are pivoted a pair of curved clamping-arms 14. The lower ends of these arms 14 engage the outer edges of the channeled rim of the wheel, their inner faces being formed to overlie the shouldered or undercut portions of the tire, and thereby retain in place therein the retaining-wires. As a simple means for securing the clamping-arms in rigid engagement with the rim, I may employ a pair of keys 15, passing through the slots in the plates under the rim of the wheel, as plainly shown in Fig. 2.

Secured between the horizontal members of the frames 8, on a transverse rod 16, is a carrier mechanism, the function of which is to engage and support the endless retaining-wires after the same have been secured in place at one point on the rim by the clamp 11 and through a relatively-sliding movement along the wheel-rim parallel with the latter and concentric with the wheel-axis to force said wires over the opposite ends of the rim and into their seats in the tire for fastening the latter securely to the rim. Referring to this mechanism in detail, 17 designates a pair of side plates, in forwardly and rearwardly extending bosses of which are journaled a series of guide-rollers. The two forward rollers (designated by 18) are peripherally grooved to engage the outer edges of the channel of the wheel-rim in the manner plainly shown in Fig. 4. The rear rollers (designated by 19) are flanged to engage the outer edges of the channel-rim of the wheel and overlie the undercut portions of the tire, as plainly shown in Fig. 5. The side plates 17 are secured in rigid parallel relation by means of the transverse rod 16, passing therethrough, and an upper shorter transverse rod 20, passing therethrough parallel to the rod 16, the said side plates being adjustably keyed to said rods by means of set-screws 21.

22 designates a pair of plates arranged transversely of and adjustably secured to the plates 17, respectively. These plates 22 at their inner ends are slightly offset at an oblique angle to the plane of the wheel and have journaled on the inner opposing faces of said oblique portions a pair of wire-engaging rollers 23. The guide-rollers and wire-supporting rollers on the opposite sides of the carrier are laterally adjustable toward and from each other to accommodate wheel-rims of varying widths by means of the adjustable engagement of the side plates 17, with which all of said rollers are connected on the transverse rods 16 and 20 through the set-screws 21. In order to secure an independent lateral adjustment of the wire-supporting rollers relatively to the wheel-rim, each roller may be mounted as shown in Fig. 6, in which 23$^a$ designates an externally-threaded bushing provided with a squared end 23$^b$ and screwing through the obliquely-disposed end of the plate 22. 23$^c$ is the spindle of the roller 23, journaled in said bushing and retained therein by a nut 23$^d$ on its outer end. The bushing 23$^a$ is fixed in any position to which it may be adjusted by a retaining-nut 23$^e$. Provision is also made for a radial adjustment of the wire-engaging rollers 23 relatively to the wheel by means of screw-bolts 24, screwing through lateral offsets on the outer ends of the plates 22, the inner ends of said bolts abutting the edges of the plates 17. To permit this, one of the plates 17 or 22 is suitably slotted, as shown at 17$^a$, Fig. 7, and said plates are clamped together by a bolt and nut 17$^b$.

The rollers 23 will in the operation of the mechanism be normally adjusted to occupy positions relatively to the wheel-rim as shown in enlarged detail in Fig. 3.

In the operation of the device it is desirable that the channeled rim of the wheel after the tire has been placed in position therein shall be drawn into close engagement with the carrier device last described. For this purpose I have shown the spindle 10 as journaled in the inner ends of a pair of substantially horizontally disposed parallel bars 25, the outer ends of which are pivoted to a pair of segment-levers 26, the latter being engaged, through a pawl 27, with a toothed segment 28, secured to one of the side frames 8. This mechanism, in conjunction with the slots 9 in the upper horizontal members of the frames 8, permits wheels of widely-varying diameter to be subjected to the operation of my improved tire-applying apparatus.

In the operation of the mechanism, as will be more fully hereinafter described, it becomes necessary to partially rotate the wheel on its bearing in a direction and to an extent sufficient to draw the clamp 11 down to the nearest end of the carrier device in the final operation of forcing the retaining-wire home to its seat on the tire. A convenient connecting mechanism for performing this operation may be constituted as follows: 29 designates a curved ratchet-bar, the upper end of which is adapted to be hooked over the rod 13 of the clamp 11, said bar 29 extending down behind and below the carrier mechanism, as plainly shown in Fig. 1. At 30 is pivoted, between the side plates 17 of the carrier, a bifurcated lever 31, to which latter is pivoted a pawl 32, adapted to lie upon and engage the teeth of the ratchet-bar 29. A downward movement of the lever 31 obviously draws with it the bar 29 and clamp 11, thereby partially rotating the wheel, and on the upward movement of the lever the pawl 32 rides idly over the face of the bar and at the upward extreme of the lever's movement takes a fresh hold in the ratchet-teeth.

In the operation of my improved tire-applying apparatus the wheel to which a tire is to be applied is mounted in the frame 6 in the manner plainly shown in the drawings, the ends of the spindle 10 passing through the inner ends of the arms 25. A section of tire of the exact length required to surround the rim of the wheel is then temporarily secured in the latter at one end, as by means of a section of wire twisted thereabout, as shown at 33. The endless retaining-wires are then inserted in the undercut or grooved portions of the tire, on either side thereof, and the tire and retaining-wires are then initially held in the rim slightly behind the temporary retaining-wire 33 by means of the clamp 11. The tire, with the retaining-wires seated in the grooves thereof, is then carried by hand around the rim; but by reason of the fact that the retaining-wires are of less circumferential length than the rim the said wires cannot be forced home to their seats in the tire by hand, but for a portion of their length will occupy the position of chords to the circle described by the rim of the wheel, as shown in Fig. 1. The tire having been thus seated in the rim by hand and the retaining-wires having been similarly seated in the tire to the extent possible by hand, the wheel is then by the lever 26 drawn into snug engagement with the carrier mechanism, the fore and aft wheels of the latter engaging the opposite sides of the channeled rim of the wheel in the manner shown in Figs. 4 and 5. The chord members of the retaining-wires are then drawn over the periphery of the obliquely-disposed wheels 23, the latter by means of the several adjusting devices described having been fixed in proper relative position to the wheel-rim, as indicated in Fig. 3. As shown in said figure, this position is such that the wires are under a constant tendency to slide or snap down off the peripheries of said guide-wheels into their seats in the undercut portion of the wire. The parts being in the described position the lever 31 is then operated, and through its connection with the curved ratchet-bar 29 operates to draw the clamp 11 down toward the carrier mechanism by a step-by-step movement, during which the rollers 23 are progressively forcing the retaining-wires home to their seats in the tire. This operation continues until the lower adjacent ends of the arms 14 engage the forward wheels 18 of the carrier mechanism, at which time the last outlying portions or chords of the retaining-wires will be forced over the rim and into their seats in the tire. It will be observed that the last-described operation is rendered possible not by any elasticity of the retaining-wires, but by the compressible character and the consequent yield of that portion of the tire in which the wires have already been seated. After the retaining-wires have been thus seated in the tire the inner or base portion of the tire is under a sufficient compression by reason of the retaining-wires to maintain the latter in snug engagement therewith, whereby the tire itself is firmly and securely held in the channeled rim against lateral or sidewise strain by the coöperative action of the said retaining-wires and the sides of the channel.

The slotting of the horizontal members of the frames 8 and the adjustable features of the carrier mechanism herein-above described render it possible to apply tires by means of my improved machine to vehicle-wheels of widely-varying diameters and widths. By means of the set-screws 21 the fore and aft wheels of the carrier can be nicely and exactly adjusted to the width of the channel-rim, such lateral adjustment of said wheels at the same time effecting the proper lateral adjustment of the guide-rollers 23 by reason of the fact that the latter are connected with the laterally-adjustable supports of the carrier-wheels, and where necessary independent lateral adjustment of the rollers 23 can be effected by the bushings 23$^a$.

It will be obvious that the capacity and utility of my invention are not limited to its employment in connection with any particular form or construction of resilient tire. I have herein shown and described a tire having an undercut groove formed in each side thereof near its base, but such form of tire is shown only as a preferred example to illustrate the mode of operation of the machine. Any form of resilient tire in or upon which an endless retaining wire or band of the character described is adapted to be seated can be expeditiously applied by the use of my invention.

From the foregoing it will be seen that my improved apparatus provides simple and efficient means whereby resilient tires of the type described may be readily applied to vehicle-wheels of widely-varying sizes by means of endless retaining wires or bands, thus obviating the necessity and the labor and loss of time incident thereto involved in first seating the retaining-wires and subsequently securing their ends together under proper tension after they have been seated.

It is obvious that numerous changes and modifications might be made in the apparatus described within the scope and purview of my invention. The latter is therefore not limited to the exact details of mechanism shown and described.

I claim as my invention—

1. In a machine for applying endless-tire-holding bands to vehicle-wheels and the like, a carrier adapted to have at longitudinally-separated points a sliding engagement relatively to the wheel-rim and having an intermediate support disposed adjacent the edge of the rim over which the chord portion of the band is trained.

2. In a machine for applying endless-tire-holding bands to vehicle-wheels and the like, a carrier having journaled in its opposite ends wheels which are adapted to ride upon the peripheral edge of the rim and having also an intermediate support disposed obliquely to the side of the rim over which the chord portion of the band is trained and by which it is guided to its seat in the tire.

3. In a machine for applying endless-tire-holding bands to vehicle-wheels and the like having channeled rims, a balanced carrier having journaled in its opposite ends on both sides thereof wheels which ride over the peripheries of the side walls or flanges of the channel and provided intermediate its ends on each side with a band-carrying support so disposed relatively to the rim as to guide and force the band progressively to its seat in the tire.

4. A machine for applying endless-tire-holding bands to vehicle-wheels and the like, comprising a support over which the band is trained, mounted to have a relative movement along the side of the rim parallel with the latter and concentric with the wheel-axis, and having a supporting-surface acting to lift the chord portion of the band progressively and guide it into its seat, and means for imparting a positive movement of the wheel-rim relatively to said support, comprising a curved ratchet-bar and a pawl-and-lever mechanism acting thereon, substantially as set forth.

5. In a machine for applying endless-tire-holding bands to vehicle-wheels and the like, a carrier adapted to have at longitudinally-separated points a sliding engagement relatively to the wheel-rim and having an intermediate support disposed adjacent the edge of the rim over which the chord portion of the band is trained in combination with a clamp for initially holding the tire and the band at one point thereof, a curved ratchet-bar connected with said clamp and a pawl-and-lever mechanism on the carrier, whereby the clamp and carrier may be caused to approach each other in the operation of seating the band, substantially as described.

6. In a machine for applying resilient tires to vehicle-wheels having channeled rims, the combination with a suitable support for a vehicle-wheel, of a clamp for initially holding the tire and an endless retaining wire or band at one point thereon, and a carrier adapted to have a parallel movement relatively to the periphery of the wheel and provided with a device for engaging said endless retaining wire or band and progressively forcing the latter over the side of the rim into fastening engagement with said tire, and coöperating elements on said clamp and carrier respectively, operating to cause said parts to gradually approach each other, thus seating the wire or band, substantially as described.

7. In an apparatus of the character described, in combination a stationary frame, in which a peripherally-channeled wheel is adapted to be rotatably supported, a carrier secured on said frame having end guide-rollers which engage the outer edges of the wheel-rim and provided with a pair of wire-engaging rollers journaled in planes oblique to and on opposite sides of the plane of the wheel, a clamp for initially holding a resilient tire and a pair of endless retaining-wires in the channel of the rim at one point on said rim, means for drawing the wheel into close engagement with said carrier, and means for causing the rotation of the wheel and a consequent travel of the clamp to the carrier, whereby the chord portions of the retaining-wires are guided and progressively forced by the wire-engaging rollers of the carrier over the outer edges of the rim and into fastening engagement with the tire, substantially as described.

8. In an apparatus of the character described, in combination a stationary frame in which a peripherally-channeled wheel is adapted to be rotatably and adjustably supported, a carrier secured on said frame having end guide-rollers which engage the outer edges of the wheel-rim and provided with a pair of wire-engaging rollers journaled in planes oblique to and on opposite sides of the plane of the wheel, said last-named rollers being radially and laterally adjustable relatively to the wheel, a clamp for initially holding a resilient tire and a pair of endless retaining-wires in the channel of the rim at one point on said rim, means for drawing the wheel into close engagement with said carrier, and means intermediate said clamp and carrier for rotating the wheel and drawing the clamp to the carrier, whereby the chord portions of the retaining-wires are guided and progressively forced by the wire-engaging rollers of the carrier over the outer edges of the rim and into fastening engagement with the tire, substantially as described.

9. In an apparatus of the character described, the combination with the slotted-wheel-supporting frame of a carrier device mounted thereon, the latter comprising a framed structure having end guide-rollers which engage the rim of the wheel and a pair of wire-engaging rollers disposed obliquely to the plane of the wheel, a pivoted lever and connections therefrom to the hub of the wheel for drawing the latter into close engagement with the carrier, a clamp for initially holding the tire and a pair of endless retaining-wires seated thereon at one point on the rim, and mechanism intermediate said clamp and carrier for gradually drawing the two together, whereby the chord portions of the retaining-wires are gradually and progressively forced over the edges of the rim into their seats in or upon the tire, substantially as described.

10. In an apparatus of the character described, the combination with the slotted-wheel-supporting frame of a carrier device mounted thereon, the latter comprising a framed structure having laterally-adjustable end guide-rollers which engage the rim of the wheel and a pair of laterally and radially adjustable wire-engaging rollers disposed obliquely to the plane of the wheel, means for drawing the latter into close engagement with the carrier, a clamp device having a pair of curved arms the ends of which initially engage and hold the tire and the retaining-wires at one point in the rim of the wheel, a curved ratchet-bar connected to said clamp device and extending to the proximity of the carrier, and a lever pivoted on said carrier and having a pawl for engaging said ratchet-bar, whereby the clamp is drawn gradually toward the carrier and the chord portions of the retaining-wires are progressively forced over the edges of the rim into their seats in or upon the tire, substantially as described.

BENJAMIN KENNA.

Witnesses:
SAMUEL N. POND,
L. F. MCCREA.